Patented Dec. 19, 1939

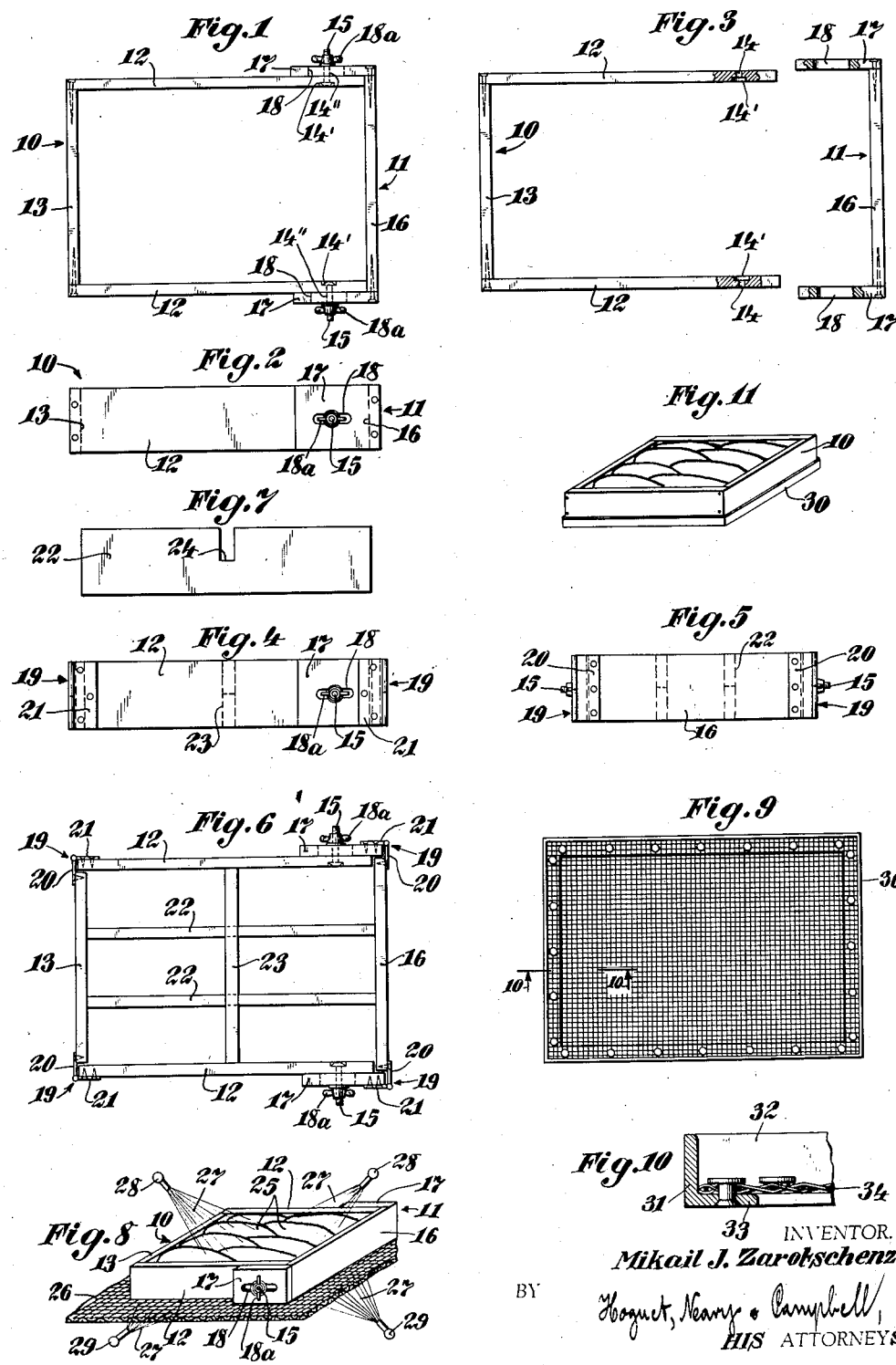

2,183,732

UNITED STATES PATENT OFFICE 2,183,732

FRAME FREEZING

Mikail T. Zarotschenzeff, New York, N. Y., assignor to Z. Pack Corporation, Jersey City, N. J., a corporation of Delaware Application August 11, 1937, Serial No. 158,536

7 Claims. (Cl. 62—104)

The present invention relates to the freezing of food products and embodies, more specifically, an improved method and apparatus by means of which food products, such as chickens, ducks, etc., may be shaped and quick frozen in an improved manner. This application is a continuation in part of applicant's copending application Serial No. 1,851, filed January 15, 1935, and abandoned June 12, 1938, for "Frame freezing", and contains all of the subject matter of the said copending application, additionally reciting a particular foraminous structure by means of which the shaped and framed products may be supported during the freezing operation in such fashion as to enable the freezing medium to reach the exposed surfaces of the products being frozen.

The invention contemplates, especially, an improved method and apparatus by means of which food products of pliable and irregular contour may be effectively positioned and shaped prior to and during the actual freezing operation. In this connection, an object of the invention is to provide an improved method and apparatus by means of which products of the above character may be frozen in such fashion as to preserve them in a desired shape and also prevent damage to the products prior to and during the freezing operation.

In accordance with present practice, the products are packed tightly in barrels or other suitable containers and are then placed in so-called sharp freezers or refrigerators, after which the products are frozen by a slow freezing operation usually requiring several days. This length of time is required because of the fact that the heat interchange relationship between the freezing medium and the products in the center of the barrel or box takes place comparatively slowly. During the time of freezing the products within the containers are misshapen, particularly at the bottom where the weight to which they are subjected is comparatively great. In accordance with the present invention, products may be frozen in such fashion as to preserve a desired shape and appearance, the freezing operation taking place with such rapidity that the products become "quick frozen", a term which is now well recognized in the trade.

This invention is attained by placing the products within suitable frames which serve to shape and restrain growth of the products during freezing, the products thus framed being introduced into a freezing chamber in order that they may be subjected to a low temperature freezing medium and be "quick frozen". It is preferred that the frames be open at the top and bottom thereof in order that freezing medium may be introduced thereinto and contact the products upon opposite sides of the frame, thus greatly expediting the freezing operation.

A further object of the invention is to provide an apparatus by means of which the frames and products carried thereby may be effectively supported during the freezing operation, at the same time permitting the freezing medium to pass freely through the supporting structure and contact the products to be frozen.

A further object of the invention is to provide, in a method and apparatus for quick freezing food products, a frame structure which may constitute a part of the ultimate container or package in which the food products may be shipped or sold, in a modified form being of such construction as to permit a limited adjustment in order that the frame may accommodate varying sizes of products being frozen.

Further objects of the invention will appear as it is described in greater detail in connection with the accompanying drawing, wherein:

Figure 1 is a plan view of a frame constructed in accordance with the present invention;

Figure 2 is a view in side elevation of the figure shown in Figure 1;

Figure 3 is a view similar to Figure 1 showing the parts of the frame separated;

Figure 4 is a view in side elevation of a modified form of frame;

Figure 5 is a view in end elevation of the construction shown in Figure 4;

Figure 6 is a plan view of a further modified form of the invention;

Figure 7 is a view in front elevation of one of the separator members shown in Figure 6;

Figure 8 is a perspective view of the frame with products therein supported in position during the freezing operation;

Figure 9 is a plan view of a supporting device for a frame such as shown in Figures 1 through 8;

Figure 10 is a detail view in section taken on line 10—10 of Figure 9 and looking in the direction of the arrows;

Figure 11 is a perspective view similar to Figure 8 showing the manner in which the frame and supporting element are positioned during the freezing operation.

With reference to the construction shown in Figures 1, 2 and 3, a frame is shown as being formed of two telescoping sections 10 and 11.

The section 10 is formed with side walls 12 and an end wall 13, these walls being secured in any desired fashion. Adjacent the open ends of the sides 12 of element 10, apertures 14 are provided through which bolts 15 are adapted to pass. The heads of bolts 15 are preferably received within recesses 14' in order that they may not project within the frame.

The telescoping section 11 is formed with an end wall 16 to which side wall sections 17 are secured. These elements are of sufficient size to move telescopically over the walls 12 as shown in Figures 1 and 3. Elongated slots 18 are formed in the side walls 17, the shanks 14'' of bolts 15 passing therethrough as illustrated in Figures 1 and 2. Wing nut 18a is received on the threaded end of the shank and enables the walls 12 and 17 to be secured together in a desired position.

In the construction shown in Figures 4, 5, 6 and 7, a modified form of frame is illustrated, the end walls 13 and 16 being secured to the respective side walls 12 and 17 by means of hinged joints 19. The hinge elements 20 and 21 of these joints are secured respectively to the end and side walls 13—16 and 12—17, respectively, as illustrated in Figure 6. In this fashion, the walls may be moved hingedly with respect to each other to facilitate the racking or framing of products therewithin. In this fashion, where the width of the products to be received within the frame exceeds the interior dimensions of the frame, the sides 12 and 17 may be swung outwardly to enclose the products, after which the forcing of these sides inwardly compresses the products to the desired size.

If desired, the frame may be provided with cross partitions 22 and 23 which may be formed with recessed portions to enable the elements to be positioned in mortised relationship at 24 as illustrated in the drawing. If desired, the hinged connection between the walls may be provided only between certain of the walls rather than between all sections thereof. The telescopic frame formation permits the products, as for example, chickens, ducks, etc., which in general are of irregular shape, to be assembled or packed in the frame and preserved in their normal contour during the freezing operation. By providing the adjustability of the frame, irregularity in sizes and contour of the products may be compensated for and a well formed group of products result from the freezing operation.

The hinge formation on the frame shown in Figures 4 through 6, permits the products to be shaped by movements of the frame sections in the plane of the frame, the frame permitting the upper and lower surfaces of the products to be engaged by the freezing medium.

Moreover, the hinging of the frame members 10 and 16 enables them to be pressed or squeezed together, thus shaping up the products properly for freezing and preventing growth thereof in the plane of the frame during the freezing operation.

With reference to Figure 8, the frame is shown in position during the freezing operation. In this figure, the products are indicated at 25, these products having been placed within the frame and the frame positioned so as to shape up the products properly. A wire mesh conveyor 26 may carry the frame between sprays 27 of a refrigerating liquid such as atomized brine, nozzles 28 and 29 being provided above and below the open portions of the frame in order to direct the refrigerant against the products therein. Inasmuch as the conveyor is of wire mesh, the refrigerant passes readily therethrough and reaches the lower surface of the products.

It will be readily apparent that the present invention is not only applicable for the freezing of chickens, ducks, etc., but may also be used in connection with all pliable products of irregular shape, the framing of such products causing them to be presented to the freezing medium in a relatively thin layer with an extended surface exposed in order that a rapid heat interchange may take place. During the freezing operation, the products are maintained firmly in shape in order that a desired form and contour may be preserved therein to improve the appearance and physical characteristics thereof. The invention, moreover, greatly facilitates the handling of the products in order that they may be "quick frozen" and packed with a minimum of handling. If desired, the products, after being frozen, may be washed while still in the frame and supported by the conveyor, and the frame may then be removed by separating the telescoping sections, permitting the products to be placed in suitable containers. By maintaining the products in the manner above described, they will be frozen into a solid block and thus greatly facilitate the packing of the products in the final shipping container.

In the construction shown in Figures 9, 10 and 11, instead of providing a wire mesh conveyor 26, a support 30 is provided having a flanged member 31 at the sides thereof. The flanged member provides sides 32 and a bottom flange 33 upon which a wire mesh support 34 is secured. The support 30 is made of such size as to receive the frame 10 therein, as illustrated in Figure 11. When the frame 10 with the products therein is placed upon the support 30, the support may be placed within a refrigerating chamber and either held in a fixed position during the freezing operation, or may be placed upon suitable supports by means of which the frames may be passed through the chamber in a continuous freezing operation.

While the invention has been described with specific reference to the constructions shown in the accompanying drawing, it is not to be limited save as defined in the appended claims.

I claim:

1. A method of freezing food products characterized by the steps of placing the same in a frame composed of relatively movable sections, pressing the frame against the products to shape and restrain the products therein in a desired fashion and subjecting the products within the frame to a refrigerant.

2. A method of freezing pliable edible products comprising disposing the same within a frame having relatively movable sections, pressing the frame sections against the products to shape and restrain the products to a required form, and directing refrigerant spray against the exposed surfaces of said products in said frame.

3. A method of freezing irregularly shaped pliable edible products in a frame having movable portions and an open top and bottom, comprising disposing the same within the frame, adjusting the frame to shape the products to a required form, and subjecting the frame carrying the products to a refrigerant directed against the exposed portions of the products through the open top and bottom of the frame.

4. A frame for packaging products for refrigeration, comprising a plurality of telescoping sec tions, means to interlock the sections to form an enclosure for products, said frame having an open top and bottom, the respective frame sections being longitudinally displaceable one with respect to the other, and the elements of the respective sections being angularly displaceable one with respect to the other.

5. A frame for packing products for refrigeration, comprising a plurality of separable sections, telescoping with respect to one another to provide for longitudinal adjustment, means to secure the sections in a desired position, at least one of the respective sections having relatively movable elements, and means to permit angular displacement between the said last named portions.

6. A method of freezing irregularly shaped food products characterized by the steps of placing the same in a frame composed of relatively movable sections, pressing the frame against the products by a plurality of movements in the same plane to shape and restrain the products therein in a desired fashion, and subjecting the products within the frame to a refrigerant.

7. In combination with spray means for quick freezing, means for positioning irregularly shaped products comprising a frame having an open top and bottom adapted to receive the products to shape and restrain growth thereof during freezing, and a foraminous supporting member upon which the frame is adapted to be carried during the freezing operation, whereby the freezing medium may pass freely through the supporting member and bottom of the frame to engage the lower surface of the products, said supporting member being formed with angle shaped side members having vertical sides within which the sides of the frame are adapted to be telescopically received.

MIKAIL T. ZAROTSCHENZEFF.